United States Patent
Otaki et al.

(10) Patent No.: US 7,205,688 B2
(45) Date of Patent: Apr. 17, 2007

(54) ACTUATOR AND BRAKE DEVICE

(75) Inventors: Ryoichi Otaki, Kanagawa (JP); Koji Hashimoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/543,057

(22) PCT Filed: Jan. 20, 2004

(86) PCT No.: PCT/JP2004/000415

§ 371 (c)(1),
(2), (4) Date: Jul. 21, 2005

(87) PCT Pub. No.: WO2004/065815

PCT Pub. Date: Aug. 5, 2004

(65) Prior Publication Data

US 2006/0081076 A1 Apr. 20, 2006

(30) Foreign Application Priority Data

Jan. 21, 2003 (JP) .............................. 2003-012165

(51) Int. Cl.
*H02K 7/10* (2006.01)
*H02K 7/116* (2006.01)
*F16D 65/18* (2006.01)
*F16H 25/20* (2006.01)

(52) U.S. Cl. .................... 310/67 R; 310/75 R; 310/77; 310/83; 188/156; 188/158; 188/161; 303/115.2

(58) Field of Classification Search ................ 188/156, 188/158, 161–164; 303/115.2; 310/67 R, 310/75 R, 80, 83, 77
See application file for complete search history.

(56) References Cited

FOREIGN PATENT DOCUMENTS

| JP | 361070269 A | * | 11/1986 |
|----|-------------|---|---------|
| JP | 3-41233 A | | 2/1991 |
| JP | 03-048054 A | | 3/1991 |
| JP | 5-96564 A | | 4/1993 |
| JP | 2722345 B2 | | 11/1997 |
| JP | 10-257716 A | | 9/1998 |
| JP | 11-46467 A | | 2/1999 |
| JP | 11-118014 A | | 4/1999 |
| WO | WO 99/60285 A1 | | 11/1999 |

\* cited by examiner

*Primary Examiner*—Darren Schuberg
*Assistant Examiner*—David W. Scheuermann
(74) *Attorney, Agent, or Firm*—Sughrue Mion, PLLC

(57) ABSTRACT

An actuator has an electric motor, a screw shaft connected to a rotational shaft of the electric motor in such a manner as to be capable of transmitting power, a nut member disposed on peripherally of the screw shaft and connected to the rotational shaft of the electric motor in such a manner as to be capable of transmitting the power and a ball rolling within a spiral groove formed between the screw shaft and the nut member, characterized in that the rotational speed of the screw shaft and the rotational speed of the nut member are different.

14 Claims, 1 Drawing Sheet

ACTUATOR AND BRAKE DEVICE

TECHNICAL FIELD

The present invention relates to an actuator and more particularly to an actuator preferable for use in, for example, an electric brake system of a vehicle and a brake system that uses the actuator.

BACKGROUND ART

Currently, disc brake systems used in many passenger cars and the like are such that a pad is pressed against a disc rotor by making use of fluid pressure that is generated by a master cylinder or the like which is made to interlock with a brake pedal so as to apply the brake. In particular, in recent years, boosters have been put into practical use in which the braking force is increased by making use of negative pressure, compressed air, fluid pressure and the like in addition to human power.

In the disc brake systems which make use of fluid pressure and the like, however, piping is necessary for fluid, which needs, in turn, designs for avoiding the interference with other components and calls for a cost increase. Furthermore, in recent years, in association with the spread of ABS (antilock brake system) and TRC (traction control system), brake systems have been in demand which are quicker to respond and which can be controlled more accurately. This background has developed electric brake systems in which the driving force of an electric motor is used to thrust a piston to press a pad against a disc rotor (refer to Japanese Patent Unexamined Publication JP-A-3-41233).

Incidentally, in the electric brake systems, there may be a case where a ball screw mechanism or the like is adopted to convert the rotational force of the electric motor into a thrust by a piston (refer to Gazette of International Unexamined Patent Publication No. 99/60285, JP-A-10-257716).

Here, for example, in the electric brake system, in order to secure a sufficient braking force, an extremely large force needs to be secured for pressing the pad against the disc rotor. In contrast to this, the torque of an electric motor that can be installed on a vehicle is generally small. On the other hand, in the ball screw mechanism, when the lead angle of the screw is changed, the reduction ratio can be increased to some extent, but this generates problems. Then, in a system disclosed in the pamphlet of International Unexamined Patent Publication No. 99/60285, a large reduction ratio is given to the output of the electric motor using a bevel gear and a planetary gear mechanism, so that a large thrust is transmitted to the pad. When the transmission system that uses the bevel gear and planetary gear mechanism, there is caused a problem that the system becomes bulky as a whole and hence, a compact construction cannot be provided. In addition, when attempting to use a smaller electric motor, the reduction ratio needs to be increased further, this causing a problem that the transmission system becomes larger in size. In addition, in the system disclosed in JP-A-10-257716, a construction is described in which a single motor is used to rotate a screw shaft and a nut, and a spline groove is cut in the screw shaft, whereby the screw shaft is rotated by rotating a nut on the spline. The invention is such that the ball screw nut and the spline nut are driven by the single motor, while normally, two motors are used to rotate separately the ball screw nut and the spline nut in order to obtain two degrees of freedom in rotation and axial movement (for example, Japanese Patent Examined Publication 2722345). To make this happen, two sets of brakes are incorporated in a speed reducer so as to create a mode for rotating only the nut of the ball screw and a mode for rotating both the nuts. This requires a mechanism which uses a number of components and which is expensive and a sophisticated control. Since an actuator of the brake system does not need to rotate, an inexpensive and compact construction is desired which lacks a control for rotational directions.

The present invention was made in view of the problems inherent in the conventional techniques, and an object thereof is to provide an actuator which can exhibit a strong driving force while being kept compact in size and a brake system using the same.

SUMMARY OF THE INVENTION

An actuator of the present invention having an electric motor, a screw shaft connected to a rotational shaft of the electric motor in such a manner as to be capable of transmitting power, a nut member disposed on periphery of the screw shaft and connected to the rotational shaft of the electric motor in such a manner as to capable of transmitting the power and a ball rolling within a spiral, groove formed between the screw shaft and the nut member, characterized in that the rotational speed of the screw shaft and the rotational speed of the nut member are different.

Since the actuator of the invention has the electric motor, the screw shaft connected to the rotational shaft of the electric motor in such a manner as to be capable of transmitting power, the nut member disposed on the circumference of the screw shaft and connected to the rotational shaft of the electric motor in such a manner as to be capable of transmitting power and the balls which roll within the spiral groove formed between the screw shaft and the nut member and the rotational speed of the screw shaft and the rotational speed of the nut member are different. in the event that the nut member is rotated relative to the screw shaft at a low rotational speed, the nut member moves in an axial direction according to the relative rotation. Therefore, in the event that the amount of the relative rotation is made small, a large reduction ratio can be provided in the axial movement of the nut member relative to the rotation of the screw shaft without changing the lead angle of the screw shaft or depending upon other transmission systems.

While a large reduction ratio can be provided when the screw shaft and the nut member rotate in the same direction, a small reduction ratio (namely, a quick motion of a member to be driven) when they rotate in different directions.

A first gear and a second gear, which have different numbers of teeth, are integrally formed on the rotational shaft of the electric motor, and a third gear and a fourth gear are integrally formed, respectively, on the screw shaft and the nut member, whereby the first and second gears preferably mesh with the third and fourth gears, respectively.

The facewidth of the first gear and the facewidth of the second gear are preferably different.

One of the screw shaft and the nut member is made stationary with respect to the axial direction, whereas the other is allowed to move in the axial direction, and of the first gear and the second gear, the facewidth of the gear which meshes with the gear formed integrally on the member which is allowed to move in the axial direction is preferably longer than the facewidth of the other gear.

At least either the gear integrally formed on the member which is allowed to move in the axial direction or the gear on the rotational shaft which meshes with the gear is preferably made from a resin. Wear and noise can be reduced by the gear which is made from a resin.

A member to be driven is preferably mounted on the member which is allowed to move in the axial direction via a thrust bearing. The friction loss can be reduced by the thrust bearing.

The member to be driven is a brake pad, and an electric brake system is preferably such that a caliper is made up of the actuator. Since the gear sets can be accommodated within the caliper, the brake actuator can be provided which is compact in size and provides a large output (thrust).

It is preferable that one of the screw shaft and the nut member is made stationary with respect to the axial direction, whereas the other is allowed to move in the axial direction. Note that when power is transmitted from the rotational shaft to the screw shaft and the nut member using the pairs of gears, in the event that the gear on the member which moves axially is made from a resin, high sliding properties are preferably provided.

It is preferable to use the actuator described heretofore in a brake system.

Figure 1:
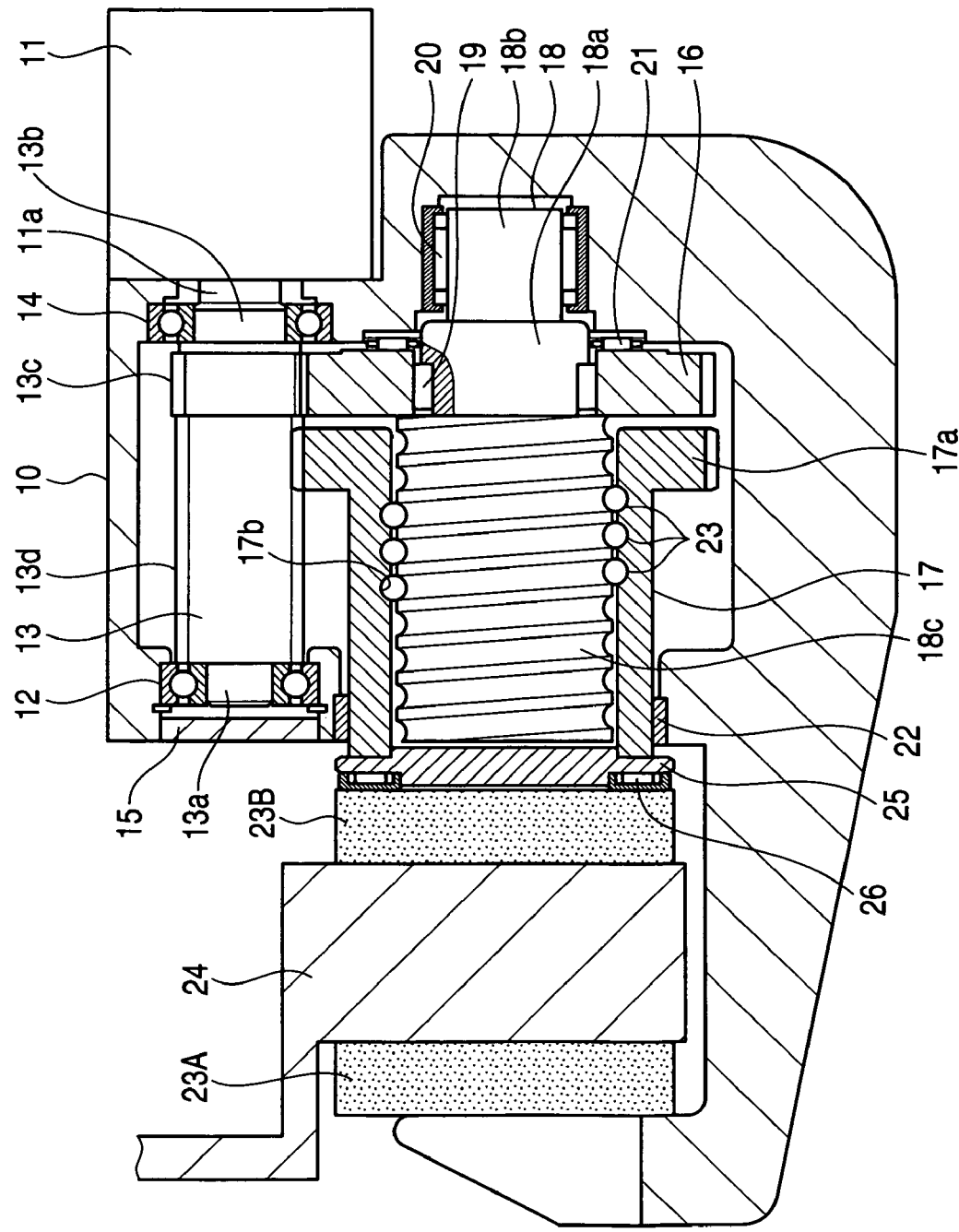
FIG. 1 is a sectional view of an electric brake system containing an actuator according to an embodiment of the invention.

Note that in the drawing, reference numerals denote as follows: 10 a housing; 11 an electric motor; 13 a gear shaft; 16 a gear; 17 a cylindrical member; 18 a screw shaft; 23 a ball; 23A, 23B pads; and 24 a disc rotor.

BEST MODE FOR CARRYING OUT THE INVENTION

Next, an embodiment of the present invention will be described by reference to the drawing. FIG. 1 is a sectional view of a brake system in which an actuator of a first embodiment is installed.

In FIG. 1, a rotational shaft 11a of an electric motor 11 mounted on a housing (making up a caliper) 10 having a U-shaped section which is fixed to a vehicle body, not shown, is connected to an end portion of a gear shaft (a rotational shaft) 13 which is supported by bearings 12, 14 rotatably relative to the housing 10 at cylindrical shaft portions 13a, 13b situated at ends thereof so as to rotate together with the gear shaft 13. Note that an opening in the housing 10, in which the gear shaft 13 is provided, is closed with a lid 15. Note that a preload is given to the bearings 12, 14 so as to eliminate axial loosening.

A gear portion 13c (a first or second gear) having a number of teeth $Z_A$ and a short axial width and a gear portion 13d (the first or second gear) having a number of teeth $Z_C$ and a long axial width are formed on a circumferential surface of the gear shaft 13 excluding the cylindrical portions 13a, 13b. The gear portion 13c meshes with a gear 16 (a third gear) having a central opening and a number of teeth $Z_B$, and the gear portion 13d meshes with a flange-shaped gear portion 17a (a fourth gear) which is formed on a hollow cylindrical member 17 and which has a number of teeth $Z_D$. The gear 16 is mounted on a larger cylindrical portion 18a of a screw shaft 18 which is made to pass through the inside of the cylindrical member 17 using a key 19 in such a manner as to rotate together with the cylindrical member 17.

A smaller cylindrical portion 18b of the screw shaft 18, which is formed on a right side thereof as viewed in the drawing, is supported by a needle bearing 20 rotatably relative to the housing 10. A right side surface, as viewed in the drawing, of the gear 16 fixed to the screw shaft 18 is supported by a thrust bearing 21 rotatably relative to the housing 10. The cylindrical member 17 is supported by a bush 22 rotatably and axially movable relative to the housing.

A thread groove 18c is formed in an outer circumferential surface of the screw shaft 18 excluding the cylindrical portions 18a, 18b, whereas a thread groove 17b is formed in an inner circumferential surface of the cylindrical member (a nut member) 17 disposed on the outer circumferential surface of the screw shaft 18 in such a manner as to correspond to the thread groove 18c, and a number of balls 23 are disposed in a spiral space formed by both the thread grooves 18c, 17c in such a manner as to roll therein. Furthermore, although not shown, a tube is provided on the outer circumference of the cylindrical member 17 for returning the balls 23 from one end to the other end of a transfer path. The cylindrical member 17, the screw shaft 18 and the balls 23 make up a ball screw mechanism.

A disc rotor 24, which rotates together with a wheel (not shown), is disposed in such a manner as to be held by a pad 23A fixed to the housing 10 and a movable pad 23B, and a pressing member 25 for pressing the pad 23B against the disc rotor 24 is mounted on a left end of the cylindrical member 17 as viewed in the drawing. A thrust bearing 26 is disposed between the pressing member 25 and the pad 23B so as to function to prevent the transmission of a rotational force of the pressing member 25 which rotates together with the cylindrical member 17. Note that the thrust bearing 26 may be disposed between the cylindrical member 17 and the pressing member 25.

The operation of the embodiment will be described. In FIG. 1, when electric power is supplied from a power supply, not shown, so that the rotational shaft 11a of the electric motor 11 and the gear shaft 13 rotate clockwise, the gear 16, which meshes with the gear portion 13c, rotates together with the gear shaft 13 counterclockwise, and the cylindrical member 17 having a gear portion 17a which is in mesh engagement with the gear 13d rotates together with the gear shaft 13 counterclockwise. Here, if a (the number of teeth $Z_A$/the number of teeth $Z_B$) and a (the number of teeth $Z_C$/the number of teeth $Z_D$) are different, and the (the number of teeth $Z_A$/the number of teeth $Z_B$)>the (the number of teeth $Z_C$/the number of teeth $Z_D$), since the rotational speed (the number of rotations) of the gear 16 or the screw shaft 18 is higher than the rotational speed (the number of rotations) of the cylindrical member 17, there is caused a difference in rotational speed. In case the ball screw mechanism is a right-hand thread, the cylindrical member 17 moves leftwards in the axial direction as viewed in the drawing. When the cylindrical member 17 moves leftwards in the axial direction, the pressing member 25 presses the pad 23B against the disc rotor 24 via the thrust bearing 26, whereby a braking force is exhibited. As this occurs, a reaction force of the pad 23B is borne by the thrust bearing 21 via the screw shaft 18 and the gear 16. Note that when electric power having an opposite characteristic is supplied from the power supply, not shown, so that the rotational shaft 11a of the electric motor 11 rotates in the other direction, the pad 23B is separated apart from the disc rotor 24 as opposed to the aforesaid movement.

Here, a reduction ratio i of this embodiment is expressed by the following equation:

$$i = 1/\{(Z_A/Z_B) - (Z_C/Z_D)\} \quad (1)$$

Namely, the nearer the (the number of teeth $Z_A$/the number of teeth $Z_B$) and the (the number of teeth $Z_C$/the number of teeth $Z_D$) are to each other, the larger the reduction ratio i becomes, and even when the torque of the electric motor 11 is small, a large pressing force by the pad 23B can be secured. To be specific, when $Z_A=16$, $Z_B=61$, $Z_C=15$ and $Z_D=62$, i=49. Consequently, according to the embodiment, since such a large reduction gear ratio can be obtained, even when a small torque, high rotational speed motor is used, a large pad pressing force can be secured without using other transmission devices such as a bevel gear and a planetary gear mechanism, whereby a compact construction can be provided. However, in case, in addition to the embodiment, a bevel gear and a planetary gear mechanism are provided, a larger pad pressing force can be secured.

Note that the gear 16 and, in particular, the gear portion 17a of the cylindrical member 17 which moves axially or the gear portion 13d is made from a resin, the sliding properties are increased, whereby the wear of the surfaces of the teeth is reduced, and a noise suppressing effect can be expected. As this occurs, the cylindrical member 17 is preferably of a hybrid construction of the resin material (the gear portion) and a steel material (the nut portion).

Thus, while the invention has been described heretofore by reference to the embodiment thereof, the invention is not construed as being limited thereto, but may, or course, be modified and improved appropriately.

While the invention has been described in detail and by reference to the specific embodiment heretofore, it is clear to those skilled in the art that the invention can be changed and modified variously without departing from the spirit and scope of the invention.

The subject patent application is based on the Japanese Patent Application (No. 2003-012165) filed on Jan. 21, 2003 and the contents thereof is incorporated herein by reference.

INDUSTRIAL APPLICABILITY

Since the actuator of the invention has the electric motor, the screw shaft connected to the rotational shaft of the electric motor in such a manner as to be capable of transmitting power, the nut member disposed on the circumference of the screw shaft and connected to the rotational shaft of the electric motor in such a manner as to be capable of transmitting power and the balls which roll within the spiral groove formed between the screw shaft and the nut member and the rotational speed of the screw shaft and the rotational speed of the nut member are different, in the event that the nut member is rotated relative to the screw shaft at a low rotational speed, the nut member moves in an axial direction according to the relative rotation, and therefore, in the event that the amount of the relative rotation is made small, a large reduction ratio can be provided in the axial movement of the nut member relative to the rotation of the screw shaft without changing the lead angle of the screw shaft or depending upon other transmission systems.

The invention claimed is:

1. An actuator comprising:
   an electric motor;
   a screw shaft connected to a rotational shaft of the electric motor in such a manner as to be capable of transmitting power;
   a first gear portion formed on an entire outer circumferential surface, except for shaft support portions, of said rotational shaft;
   a nut member disposed on a periphery of the screw shaft and connected to the rotational shaft of the electric motor in such a manner as to be capable of transmitting the power;
   a second gear portion directly formed on a flange portion of said nut member; and
   a ball rolling within a spiral groove formed between the screw shaft and the nut member, characterized in that the rotational speed of the screw shaft and the rotational speed of the nut member are different.

2. The actuator as set forth in claim 1, characterized in that the screw shaft and the nut member rotate in the same direction.

3. The actuator as set forth in claim 1, characterized in that one of the screw shaft and the nut member is made stationary with respect to an axial direction, and the other is allowed to move in the axial direction.

4. An actuator as set forth in claim 1, characterized in that a first gear and a second gear, which have different numbers of teeth from each other, are integrally formed on the first gear portion rotational shaft of the electric motor, and
   a third gear and a fourth gear are integrally formed, respectively, on the screw shaft and the second gear portion of the nut member, whereby the first and second gears mesh with the third and fourth gears, respectively.

5. An actuator as set forth in claim 4, characterized in that a facewidth of the first gear and a facewidth of the second gear are different from each other.

6. An actuator as set forth in claim 5, characterized in that one of the screw shaft and the nut member is made stationary with respect to the axial direction, whereas the other is allowed to move in the axial direction, and
   in that of the first gear and the second gear, the facewidth of the gear which meshes with the gear formed integrally on the member which is allowed to move in the axial direction is longer than the facewidth of the other gear.

7. An actuator as set forth in claim 4, characterized in that at least either the gear integrally formed on the member which is allowed to move in the axial direction, or the gear on the rotational shaft which meshes with the gear formed on the member which is allowed to move in the axial direction, is made from a resin.

8. An actuator as set forth in claim 3, characterized in that a member to be driven is mounted on the member which is allowed to move in the axial direction via a thrust bearing.

9. An actuator as set forth in claim 8, characterized in that the member to be driven is a brake pad.

10. An electric brake system characterized in that a caliper is made up of the actuator set forth in claim 9.

11. A brake system characterized by usage of the actuator set forth in claim 1.

12. An actuator as set forth in claim 1, wherein said second gear portion is directly formed on an outer peripheral surface of said flange portion of said nut member.

13. An actuator as set forth in claim 1, wherein a diameter of said second gear portion is the same as a diameter of said flange portion.

14. An actuator as set forth in claim 1, wherein said flange portion is disposed on said nut member so that there is no relative axial movement between said second gear portion and the spiral groove of said nut member as said nut member and said screw shaft undergo relative rotation.

* * * * *